United States Patent Office 3,663,625
Patented May 16, 1972

3,663,625
BIS[1-ALKYL(OR ARYL)VINYL]p-PHENYLENE
OXIDE MONOMERS
Roy G. Neville, San Carlos, Calif., assignor to Bechtel
International Corporation
No Drawing. Filed Apr. 23, 1970, Ser. No. 31,358
Int. Cl. C07c 43/22
U.S. Cl. 260—612 R         1 Claim

ABSTRACT OF THE DISCLOSURE

This invention relates to a group of polyindanyl polymers derived from disubstituted phenylene oxides. When suitably catalyzed, the monomers of the invention are polymerized to materials that exhibit improved thermal stability, chemical resistance and mechanical flexibility. These polymeric products can be employed as adhesives, coating materials, and laminating resins; and, when suitably reinforced, they can be used as structural plastics.

BACKGROUND OF THE INVENTION

In the prior art, α-methylvinyl- (i.e. isopropenyl) and/or α-phenylvinyl-substituted aromatic compounds (typified by α-methylstyrene or 1,1-diphenylethylene) are polymerized by means of free radical catalysts, or Lewis acid catalysts, to yield polymers which possess linear aliphatic chains in their polymer structure. Such aliphatic chains usually exhibit poor resistance to heat and chemical attack, because hydrocarbon chains are not noted for their thermal stability.

Although some high temperature resistant resins such as the polyimides, polybenzimidazoles, polyquinoxalines, and polypyrrones have provided some degree of success, these polymers required meticulous control of stoichiometry to attain usable molecular weights. At this stage the oligomer (i.e. lower molecular weight polymer) is usually only sparingly soluble (or insoluble) even in exotic solvents. Finally cure to practicable and useful polymeric materials involves elimination of solvents and liberation of small volatile molecules (e.g. water, produced in the act of polymerization), thus producing an intrinsically porous material.

SUMMARY OF THE INVENTION

This disclosure provides details of the composition and method of preparation of two closely related families of homologous bis (α-substituted-vinyl monomeric compounds containing phenylene oxide "backbones", and of polymerizing the same. The invention comprises the synthesis of soluble difunctional bis (α-substituted-vinyl) monomers which may be polymerized in place to produce polymers having long chains and low cross-link density without simultaneous liberation of small molecules.

Typical examples of the monomers of this invention are:
bis[4(1-methylvinyl)phenyl]ether
1,4-bis[4(1-methylvinyl)phenoxy]benzene
bis{4[4(1-methylvinyl)phenoxy]phenyl}ether
bis[4(1-phenylvinyl)phenyl]ether
1,4-bis[4(1-phenylvinyl)phenoxy]benzene
bis{4,[4(1-phenylvinyl)phenoxy]phenyl}ether The chemical structures of these disubstituted monomers are given elsewhere in this disclosure.

The invention herein disclosed describes the preparation of thermally-resistant polymers which are formed by a chemical mechanism that does not release small molecules (e.g. water) as by-products of the polymer-forming process. Moreover, by suitable choice of the catalyst system, these α-substituted vinyl derivatives can be made to polymerize, by ring closure, to thermally-resistant indanyl groups, rather than to the less thermally-stable, conventional "polystyrene-type" straight-chain aliphatic polymer structure. Thus, the polymers of this invention are composed not only of thermally-stable "backbones," but also of thermally-stable "connecting links," which latter are extremely uncommon and are formed by an addition and rearrangement mechanism which does not involve the elimination of volatile small molecules.

This invention includes the two related families of substituted divinyl monomers, having long flexible chains and low polymer cross-link density, the generic structure of which may be generally characterized as follows:

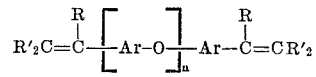

where:

Ar is a homocyclic aromatic structure selected from the class comprising:

—$C_6H_4$—, —$C_6H_4$—$C_6H_4$—, —$C_6H_4$—O—$C_6H_4$—,
—$C_6H_4$—O—$C_6H_4$—O—$C_6H_4$—

R is selected from the class consisting of straight-chain alkyl groups (having from one to five carbon atoms), phenyl, biphenylyl, naphthyl or fluoroalkyl groups (having from one to five carbon atoms); and R′ is selected from the class comprising H or straight-chain alkyl groups having from one to five carbon atoms, $n$ being an integer from 1 to 6.

DETAILED DESCRIPTION OF INVENTION

The inventive concept disclosed herein includes a method for obtaining two groups of homologous bis-isopropenyl and bis-phenylvinyl monomeric compounds, capable of polymerization, having the structure expressed by chemical symbols in Equation 3 below. Substituted-vinyl compounds of the general nature thus symbolized can be prepared by a series of sequential reactions which are broadly characterized by Equations 1, 2 and 3 below, and illustrated by Examples I through IV. First, the parent aryl ether, or polyaryl ether is treated with an organic acid halide (usually a chloride), e.g. an aliphatic or an aromatic acid halide, using appropriate procedures known to the prior art including the Friedel-Crafts procedure. This yields a disubstituted aryl derivative of the aryl ether (which is usually oriented para, para′), or polyaryl polyether according to the general reaction:

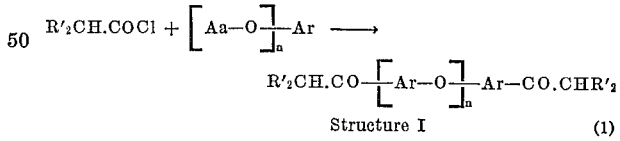

Structure I        (1)

Structure I is then isolated, suitably purified by recrystallization as is hereinafter described, then treated with a Grignard reagent to yield a bis-alcohol intermediate:

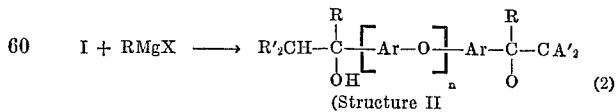

(Structure II)     (2)

The bis-alcohol of Structure II is then heated under reflux in a solvent (usually xylene), and in the presence of a trace of an acid catalyst (usually phosphoric acid), to eliminate the elements of water and form the α-substituted-vinyl groups:

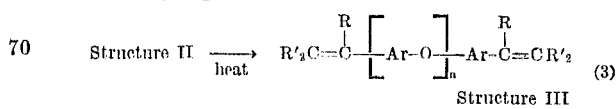

Structure III      (3)

Polymerization of compounds of the type of structure III can readily be effected by treating the bis(substituted-vinyl) monomers with Lewis acid catalysts, the most suitable being those selected from the class of metal halides typified by stannic chloride ($SnCl_4$), aluminum chloride ($AlCl_3$), ferric chloride ($FeCl_3$), phosphorus trichloride ($PCl_3$), boron trifluoride ($BF_3$) and the like.

The temperature and pressure required for cure will necessarily vary according to the particular monomer being polymerized. Thus, the pressure can range from 1 to 200 p.s.i., and the temperature can be within the range of $-30°$ C. to about $250°$ C. in order to provide a satisfactory cure. Preferably conditions are 15 p.s.i. and $80°$ to $180°$ C.

The following are specific examples of the preparation of the intermediate and final compounds of this invention. Wherever reference is made by use of a Roman numeral to a monomer, the structural formula of the monomer will be found on either Table I or Table II.

Example I.—Bis(4-acetylphenyl)ether

Acetyl chloride (454.0 g., 5.77 moles), finely powdered anhydrous aluminum chloride (908.0 g., 6.8 moles), and dichloromethane (900 ml.) were cooled to $-30°$ C. Phenyl ether (467.0 g., 2.75 moles) in dichloromethane (300 ml.) was added slowly, with stirring, during 60 min., while the temperature was maintained at approximately $-30°$ C. The mixture was stirred at $-10°$ C. for 2 hrs., then left unstirred at $20°$ C. overnight. The dark-red solution was poured onto crushed ice (ca. 3 kg.), extracted with dichloromethane, and the extract was washed to pH 7 with water. The organic layer was dried over anhydrous magnesium sulfate, filtered, and the solvent was removed by means of a rotary evaporator. The cream-colored solid was recrystd. from ethanol to give 628.0 g. (90%) of colorled platelets, M.P. $102.5°$ C. The infrared spectrum showed a strong absorption band at 1685 cm.$^{-1}$ (C=O).

$C_{16}H_{14}O_3$ (254.3).—Calcd. (percent): C, 75.57; H, 5.55. Found (percent): C, 75.58; H, 5.52.

Example II.—Bis[4(1-hydroxy-1-phenylethyl) phenyl]ether

A warm ($30-35°$ C.) solution of I(4,4′ - diacetyldiphenyl ether) (102.0 g., 0.4 mole) in dry benzene (600 ml.) and ethyl ether (100 ml.) was purged with dry nitrogen, and then phenylmagnesium bromide (3 M, 533 ml., 1.60 moles) (100% excess) was added dropwise with stirring during 2 hr. The mixture was heated at reflux ($60°$ C.) for 10 min., then allowed to cool to room temp. with stirring. A sample (5 ml.) was removed, shaken with dil. HCl, the organic layer was separated, dried with anhydrous magnesium sulfate, filtered, and evaporated. The infrared spectrum showed no absorption due to the carbonyl group, indicating that reaction with the Grignard reagent was complete. The Grignard complex was decomposed by pouring onto crushed ice (ca. 500 g.), then hydrochloric acid (10%) was added to pH 7. The organic layer was washed with water; and the original aqueous layer was extracted with benzene (200 ml.), washed with water, then added to the organic solution. After drying over anhydrous magnesium sulfate, the solvent was removed by means of a rotary evaporator and a viscous pale-yellow oil (164 g., 100%) remained. No elemental analysis data were obtained. The structure of XI was inferred from its method of preparation, and subsequent dehydration to the alkene. The infrared spectrum of XI showed strong absorption at 3560 cm.$^{-1}$ (—OH), and at 3420 cm.$^{-1}$. (H-bonded —OH). The usual aryl ether peak was strong in the region 1230–1250 cm.$^{-1}$.

Example III.—Bis[4(1-phenylvinyl)phenyl]ether

XI (120 g., 0.29 mole) was dissolved in warm xylene (750 ml.) then placed in a 1-liter flask equipped with a reflux condenser and Dean-Stark water-trap. Concentrated orthophosphoric acid (1.2 g.) was added, and the solution was heated at reflux for 5 hr. when 10.7 ml. of water had collected in the trap (theory, 10.8 ml.). Solid sodium bicarbonate (25 g.) was added to the hot solution, and the reaction flask was shaken for 10 min., or until no further carbon dioxide was evolved. The solution was filtered hot, and the filtrate was evaporated to dryness. The pale-yellow solid (109.0 g., 99%) was recrystd. from boiling ethanol to yield XII as white iridescent needles (99.6 g., 91.1%), M.P. $138.5°$ C. The infrared spectrum showed a sharp substituted-ethylene peak at 1610 cm.$^{-1}$, aromatic bands at 1598 and 1502 cm.$^{-1}$, and an aryl ether absorption band at 1255 cm.$^{-1}$.

$C_{28}H_{22}O$ (350.4).—Calcd. (percent): C, 89.84; H, 5.88. Found (percent): C, 89.73; H, 5.85.

Example IV

α-Methylvinyl (isopropenyl) derivatives of phenylene oxides were similarly prepared from acetyl chloride to produce the diacetyl derivative of the phenylene oxide, followed by treatment with methylmagnesium bromide, and elimination of the elements of water (as above) to produce the isopropenyl derivative.

Example V.—Polymerization of isopropenyl derivatives

The above described di-isopropenyl monomers were polymerized to polymers containing indanyl groups by dissolving the appropriate monomers in methylene chloride (or some other appropriate non-reactive solvent) then adding the Lewis acid catalyst, mixing and heating in a circulating air oven. As an example, bis[4(1-methylvinyl)phenyl]ether (1.25 g.; 0.005 mole) was dissolved in methylene chloride (10 ml.) at $20°$ C. A solution of stannic chloride (2.0 ml. of 1.0% solution in methylene chloride) was added, and the methylene chloride was evaporated. The viscous oligomer was first heated at $60°$ C. for 1 hour, followed by 3 hours at $120°$ C., followed by 1 hour at $180°$ C. The product was a clear brown polymer which was completely insoluble in common organic solvents at room temperature e.g. acetone, benzene, chloroform, methylene chloride, dimethylformamide, dimethyl sulfoxide, and the like, and even at the boiling point of the solvents.

Example VI.—Differential thermal analysis data

Differential thermal analysis tests were carried out in air or nitrogen at a heating rate of $10°$ C. per minute. Specimens of cured polymeric 1,4-bis[4(1-methylvinyl) phenoxy]-benzene showed the following weight losses:

10 percent weight loss at $476°$ C.
50 percent weight loss at $580°$ C.

The above data show that these outstanding thermal stabilities are due to a polymer structure which is other than the conventional linear aliphatic "vinyl-type" polymer. It is known that α-methylstyrene will cyclize to 1,1,3-trimethyl-3-phenylindane (which is thermally stable); when heated with a strong Lewis acid catalyst; and since the structures of the monomers disclosed herein are chemically identical with α-methylstyrene, as far as their terminal groups are concerned, it is inferred that the chemical groups connecting the phenylene oxide chains are substituted indanyl rings. Infrared spectra of the polymers are indicative of this indanyl structure. The polymers disclosed herein most probably possess the following structure:

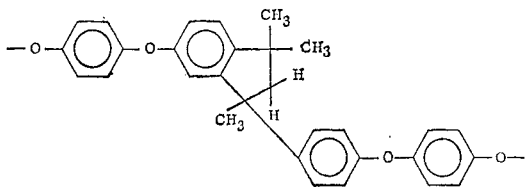

The above is an example of a substituted indanyl connecting group in polyphenylene oxide polymer chain. The following Tables 1 and 2 set forth various monomers from which novel polymers can be produced by the present invention. Reference to these monomers is made by the Roman numeral designation given in the tables.

The polymers thus formed exhibit good adhesion to aluminum and steel. They also exhibit good mechanical flexibility.

The important point of the invention disclosed herein is that the previously largely intractable thermally-stable polyphenylenes can now be linked together by thermally-stable indanyl structures. Polymeric structures can thus be carefully built up from monomers of known composition and purity to produce polymers of predictable structure. Hitherto the polyphenylene polymers known have been formed by other totally different techniques; and they have been exceedingly difficulty and impractical to use in practical applications because of their insolubility, intractability, and the fact that the polyphenylene poly-

TABLE 1

| Compound No. | Compound | Description | Reactants | Yield, percent | M.P. (°C.) | Infrared absorption (cm.⁻¹) | Analysis Calcd. C | Calcd. H | Found C | Found H |
|---|---|---|---|---|---|---|---|---|---|---|
| I | CH₃CO—⟨⟩—O—⟨⟩—O—⟨⟩—COCH₃ | Colorless iridescent platelets. | C₆H₅OC₆H₅, 467 g. (2.75 m.), CH₃COCl, 454 g. (5.77 m.), AlCl₃, 908 g. (6.8 m.), CH₂Cl₂, 1,200 ml. | 96 | 102.5 | 1,685 (C=O), 1,601 (arom.), 1,508 (arom.), 1,270 (Ar—O—Ar) | 75.57 | 5.55 | 75.68 | 5.62 |
| II | CH₃—C(CH₃)(OH)—⟨⟩—O—⟨⟩—O—⟨⟩—C(CH₃)(CH₃)OH | Amber solid. | I, 254 g. (1.0 m.), CH₃MgBr (2M), 1250 ml. (2.5 m.), C₆H₆, 800 ml.; Et₂O, 400 ml. | 100 | 93–97 | -------- | -------- | -------- | -------- | -------- |
| III | CH₃—C(CH₃)=CH₂—⟨⟩—O—⟨⟩—O—⟨⟩—C(CH₃)=CH₂ | Colorless platelets. | II, 286 g. (1.0 m.), xylene, 1,000 ml. | 90 | 107 | 1,621 (C=C) | 86.36 | 7.25 | 86.33 | 7.30 |
| IV | CH₃CO—⟨⟩—O—⟨⟩—O—⟨⟩—O—⟨⟩—COCH₃ | Nacreous platelets. | PhO—⟨⟩—OPh, 262 g. (1.0 m.), CH₃COCl, 173 g. (2.4 m.), AlCl₃, 320 g. (2.4 m.), CHCl₃, 1,500 ml. | 90 | 183.5 | 1,665 (C=O) | 76.29 | 5.24 | 76.41 | 5.23 |
| V | CH₃—C(CH₃)(OH)—⟨⟩—O—⟨⟩—O—⟨⟩—O—⟨⟩—C(CH₃)(CH₃)OH | Colorless leaflets. | IV, 173 g. (0.5 m.), CH₃MgBr (2M), 1,000 ml. (2 m.), C₆H₆, 3,000 ml. | 97 | 139 | 3,400 (—OH) | 76.17 | 6.92 | 76.12 | 6.98 |
| VI | CH₃—C(CH₃)=CH₂—⟨⟩—O—⟨⟩—O—⟨⟩—O—⟨⟩—C(CH₃)=CH₂ | Colorless platelets. | V, 378 g. (1.0 m.), H₃PO₄ (85%), 1.0 ml., xylene, 2,000 ml. | 96 | 151.5 | 1,624 (C=C) | 84.18 | 6.48 | 84.29 | 6.59 |
| VII | CH₃CO—⟨⟩—O—⟨⟩—O—⟨⟩—O—⟨⟩—O—⟨⟩—COCH₃ | Colorless scintillating platelets. | PhO—⟨⟩—O—⟨⟩—OPh, 179 g. (0.5 m.), CH₃COCl, 94 g. (1.2 m.), AlCl₃, 160 g. (1.2 m.), CHCl₃, 1,750 ml. | 87 | 185 | 1,680 (C=O) | 76.70 | 5.06 | 76.63 | 5.14 |
| VIII | CH₃—C(CH₃)(OH)—⟨⟩—O—⟨⟩—O—⟨⟩—O—⟨⟩—O—⟨⟩—C(CH₃)(CH₃)OH | Colorless leaflets. | VII, 219 g. (0.5 m.), CH₃MgBr (2M), 1,000 ml. (2 m.), C₆H₆, 2,000 ml. | 95 | 97 | 3,420 (—OH) | 76.57 | 6.43 | 76.19 | 6.18 |
| IX | CH₃—C(CH₃)=CH₂—⟨⟩—O—⟨⟩—O—⟨⟩—O—⟨⟩—O—⟨⟩—C(CH₃)=CH₂ | Colorless platelets. | VIII, 174 g. (0.4 m.), H₃PO₄ (85%), 1.0 ml., xylene, 1,000 ml. | 98 | 175 | 1,625 (C=C) | 82.92 | 6.03 | 83.00 | 5.89 |

TABLE 2

| Compound No. | Compound | Description | Reactants | Yield percent | M.P. (°C.) | Infrared absorption (cm.⁻¹) | Analysis Calcd. C | Calcd. H | Found C | Found H |
|---|---|---|---|---|---|---|---|---|---|---|
| X | Ph-CO-C₆H₄-O-C₆H₄-CO-C₆H₄-C(CH₃)(OH)-Ph | White iridescent leaflets. | C₆H₅OC₆H₅, 280 g. (1.65 m.), C₆H₅COCl, 460 g. (3.54 m.) AlCl₃, 532 g. (4.0 m.), CH₂Cl₂, 1,100 ml. | 84 | 163 | 1,642 (>C=O) | 82.50 | 4.77 | 82.65 | 4.63 |
| XI | Ph-C(CH₃)(OH)-C₆H₄-O-C₆H₄-C(CH₃)(OH)-Ph | Pale-yellow oil. | I, 102 g. (0.4 m.), PhMgBr (3 M), 533 ml. (1.6 m.), C₆H₆, 600 ml., Et₂O, 100 ml. X, 18.9 g. (0.05 m.), CH₃MgBr (2 M) 125 ml. (0.25 m.). | 100 100 | | 3,560 (-OH), 3,420 (H..O-H), 3,560 (-OH), 3,420 (H..O-H) | | | | |
| XII | Ph-C(=CH₂)-C₆H₄-O-C₆H₄-C(=CH₂)-Ph | White scintillating needles. | XI, 120 g. (0.29 m.), H₃PO₄ (85%), 1.2 g. xylene, 750 ml. | 99 | 138.5 | 1,610 (>C=C<), 1,508 (arom.), 1,502 (arom.), 1,255 (Ar-O-Ar) | 89.84 | 5.88 | 89.73 | 5.85 |
| XIII | Ph-C(CH₃)(OH)-C₆H₄-O-C₆H₄-O-C₆H₄-C(=CH₂)-Ph | Pale-yellow oil. | IV, 190 g. (0.553 m.), PhMgBr (3 M), ml. (2.25 m.), C₆H₆, 3,000 ml. | 100 | | 3,560 (-OH), 3,430 (H..O-H) | | | | |
| XIV | Ph-C(=CH₂)-C₆H₄-O-C₆H₄-O-C₆H₄-C(=CH₂)-Ph | White iridescent platelets. | XII, 100 g. (0.2 m.), H₃PO₄ (85%), 2.4 g., xylene, 1,000 ml. | 90 | 146 | 1,001 (>C=C<), 1,505 (arom.), 1,495 (arom.), 1,250 (Ar-O-Ar) | 87.55 | 5.58 | 87.45 | 5.68 |
| XV | Ph-C(CH₃)(OH)-C₆H₄-O-C₆H₄-O-C₆H₄-O-C₆H₄-C(CH₃)(OH)-Ph | Pale yellow oil. | VII, 75 g. (0.17 m.), PhMgBr (3M), 227 ml. (0.68 m.), C₆H₆, 1,200 ml. | 100 | | 3,560 (-OH), 3,430 (H..O-H) | | | | |
| XVI | Ph-C(=CH₂)-C₆H₄-O-C₆H₄-O-C₆H₄-O-C₆H₄-C(=CH₂)-Ph | Colorless needles. | XV, 101 g. (0.17 m.), H₃PO₄ (85%), 2.0 g. xylene, 1,000 ml. | 94 | 170 | 1,608 (>C=C<), 1,505 (arom.), 1,495 (arom.), 1,230 (Ar-O-Ar) | 86.02 | 5.37 | 86.08 | 5.35 | mers usually had to be formed in situ. The monomers of this invention allow polyphenylene polymers to be formed using standard and practical techniques; thus expanding the use of polyphenylenes and allowing their use in hitherto impractical situations.

While the particular details set forth above are fully capable to attaining the objects and providing the advantages suggested herein, the specific materials and methods thus disclosed are merely illustrative and can be varied to produce the same results without departing from the scope of the inventive concept as defined in the appended claim.

I claim:

1. A composition of matter having the chemical structure:

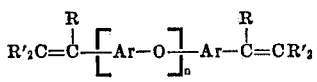

wherein:

Ar is an aromatic moiety selected from the group consisting of:

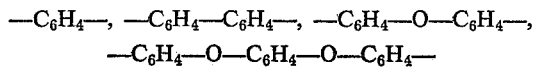

R is selected from the group consisting of phenyl, biphenylyl, naphthyl, and straight-chain alkyl groups having from 1 to 5 carbon atoms;

R' is selected from the group consisting of H and a straight-chain alkyl radical having from 1 to 5 carbon atoms; and $n$ is an integer from 1 to 6.

References Cited

FOREIGN PATENTS 241,148  10/1962  Australia _____ 260—613 R

BERNARD HELFIN, Primary Examiner

U.S. Cl. X.R.

156—327; 260—47 ET, 47 UA, 591, 592, 613 R